United States Patent
Chen

[19]

[11] Patent Number: 6,123,300
[45] Date of Patent: Sep. 26, 2000

[54] DUAL-PURPOSE LEG SUPPORT

[76] Inventor: Kao-Fu Chen, P.O. Box 82-144, Taipei, Taiwan

[21] Appl. No.: 09/323,007

[22] Filed: Jun. 1, 1999

[51] Int. Cl.[7] .......................... A47B 91/00; A47B 91/06; F16M 1/00; B62B 1/00
[52] U.S. Cl. ........................ 248/188.8; 248/677; 16/42 R; 280/38
[58] Field of Search ................... 248/677, 188.8, 248/188.9, 129, 346.11; 280/646, 38; 16/42 R, 42 T

[56] References Cited

U.S. PATENT DOCUMENTS

| | | | |
|---|---|---|---|
| 2,419,445 | 4/1947 | Fletcher | 280/38 |
| 5,312,006 | 5/1994 | Lag | 280/646 |
| 5,423,195 | 6/1995 | Peters | 280/38 |
| 5,586,775 | 12/1996 | Cheng | 280/38 |

FOREIGN PATENT DOCUMENTS

559485  2/1944  United Kingdom ..................... 280/38

Primary Examiner—Ramon O. Ramirez
Assistant Examiner—Jon A Szumny
Attorney, Agent, or Firm—A & J

[57] ABSTRACT

A dual-purpose leg support includes a base body adapted to be lockably secured on a base of a furniture item, cabinet, or machine. The base body has a spindle insertably provided in a central portion thereof. The spindle has a front end forming spherical head and an opposite end provided with a screw rod portion, a bearing having a threaded inner ring being screwably locked on the screw rod portion, with a caster fitted thereon. The base body is pre-formed with a curved grooved track that is generally one quarter of an arc so that the spindle can be erected in an upright position with a lateral face of the caster as support or the spindle can be disposed horizontally such that a caster face of the caster is in contact with the floor to allow rolling movement.

5 Claims, 8 Drawing Sheets

DUAL-PURPOSE LEG SUPPORT

BACKGROUND OF THE INVETION (a) Field of the Invention

The present invention relates to a dual-purpose leg support that allows the user to position an article stably or move the article with relative ease.

(b) Description of the Prior Art

For some furniture items like desks, cabinets, sofas, etc., the four corners of their bases are provided with pads or legs for placement on the floor. These furniture items are generally placed on the floor directly and are difficult to move especially when they contain bulky or fragile articles. Dust may easily accumulate on the floor below the furniture if they are not moved from time to time for clean-up purposes. In offices or other sites where such furniture items have to be moved quite frequently, this is indeed a problem.

The bases of some furniture items are provided with casters and caster braking means to facilitate movement. However, the casters may easily damage at the load of the furniture after prolonged use. Besides, since the casters are generally rotatable about 360 degrees and each caster is in point (line) contact with the floor, the furniture appears unstable in sight.

SUMMARY OF THE INVETION

The present invention relates to a dual-purpose leg support that allows the user to position an article stably or move the article with relative ease.

A primary object of the present invention is to provide an improved leg support structure that has the dual functions of a leg support and a caster so that the user can position an article in a stable manner or push the article with relative ease.

Another object of the present invention is to provide an improved leg support structure that allows height adjustment when it is in an upright position so as to adapt to uneven floor surfaces.

The foregoing objects and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts. Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENT

For the purpose of promoting an understanding of the principles of the invention, reference will now be made to the embodiment illustrated in the drawings. Specific language will be used to describe the same. It will, nevertheless, be understood that no limitation of the scope of the invention is thereby intended, such alterations and further modifications in the illustrated device, and such further applications of the principles of the invention as illustrated herein being contemplated as would normally occur to one skilled in the art to which the invention relates.

Figure 1:
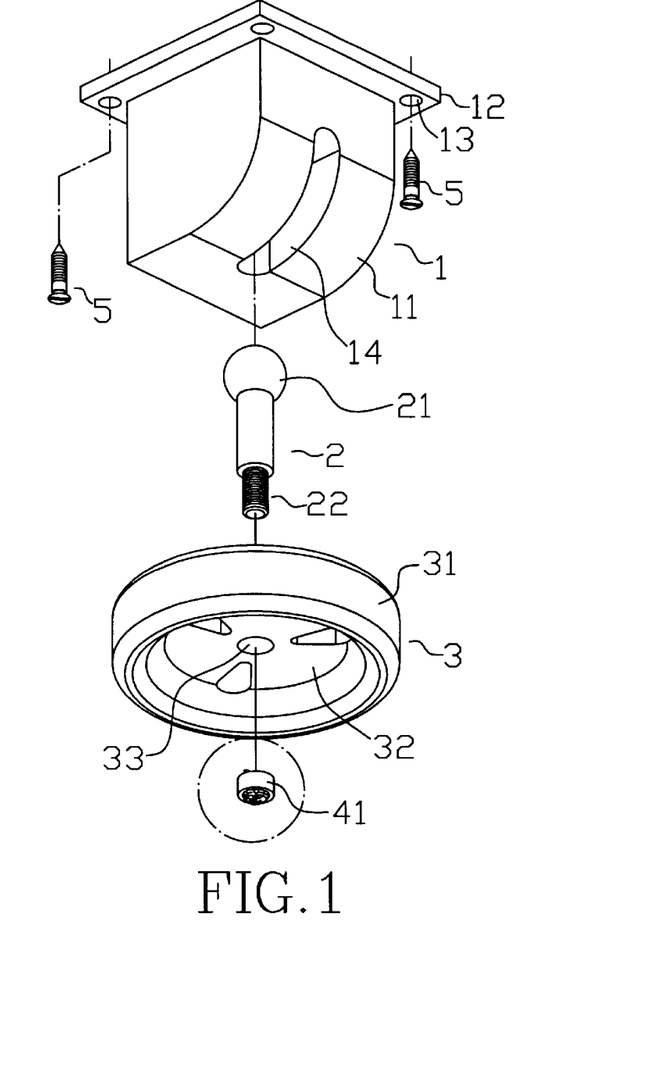
FIG. 1 is an exploded perspective view of the present invention.
Figure 1A:
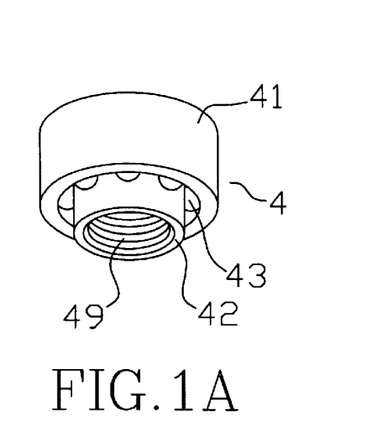
FIG. 1A is an enlarged view of a bearing of the present invention.
Figure 2A:
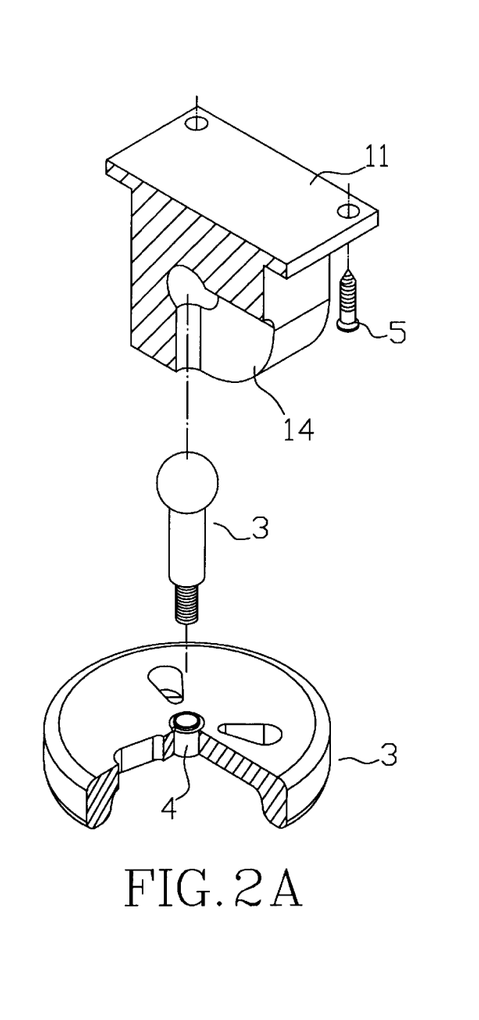
FIGS. 2A, 2B and 2C are assembled sectional perspective views of the present invention, illustrating operation of the present invention.
Figure 2B:
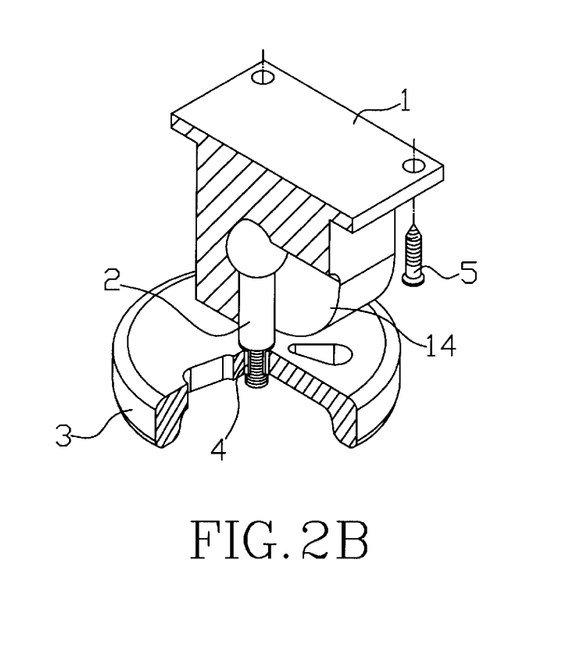
Figure 2C:
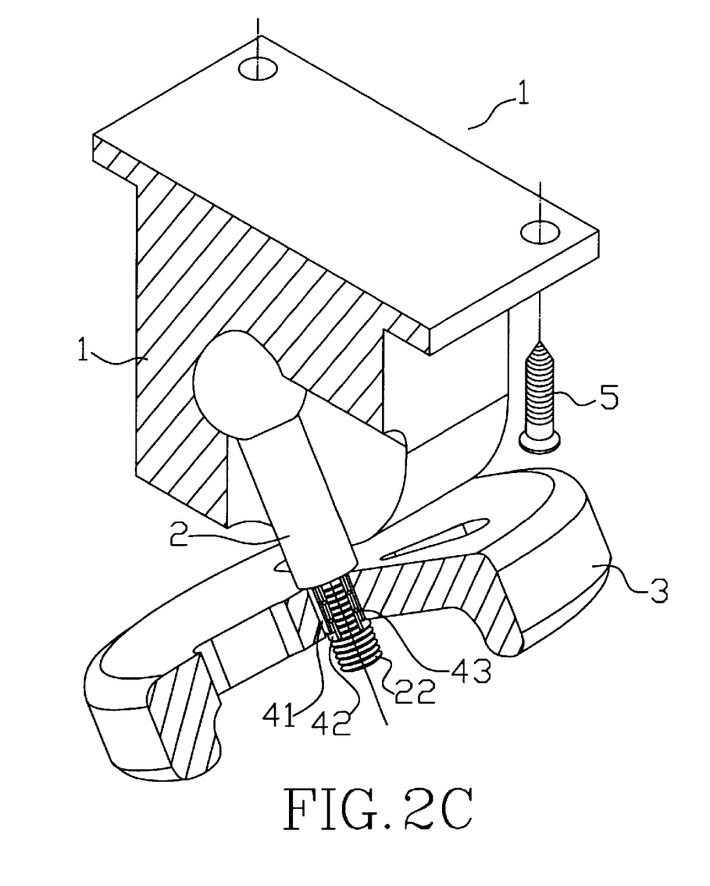

The present invention is directed to a dual-purpose leg support (as shown in FIG. 1) and includes a base body 1, a spindle 2, a caster 3, and a bearing 4. The base body 1 is integrally injection molded from rubber material and includes a curved block 11 that resembles one-quarter of a cylinder section, and a top plate 12. The top plate 12 has four corners provided with four 15 through holes 13, respectively. The curved side of the curved block 11 is provided with a curved grooved track 14 that is generally one quarter of a circle. The spindle 2 has one end configured to be a larger spherical head 21 with the other end configured to be a screw rod portion 22 of a smaller diameter. The caster 3 includes a relatively thick caster face 31 and a 20 relatively thin caster hub 32, and has a section resembling the letter "L." The caster 3 is centrally provided with a caster hole 33. The bearing 4 includes an outer ring 41 of a larger diameter, an inner ring 42 of a smaller diameter but a longer axis, balls 43 insertably disposed between the outer and inner rings 41, 42 (as shown in FIG. 1 A). The inner diameter of the inner ring 42 is tapped to have inner threads 49.

Figure 3A:
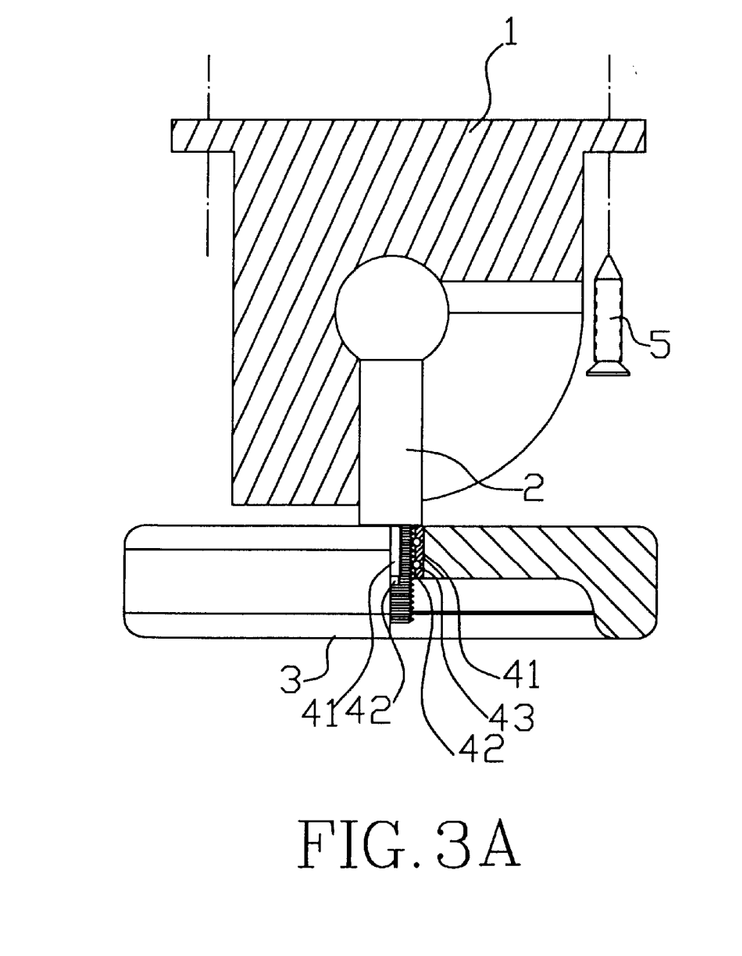
FIGS. 3A and 3B are schematic views illustrating height adjustment of the present invention.
Figure 3B:
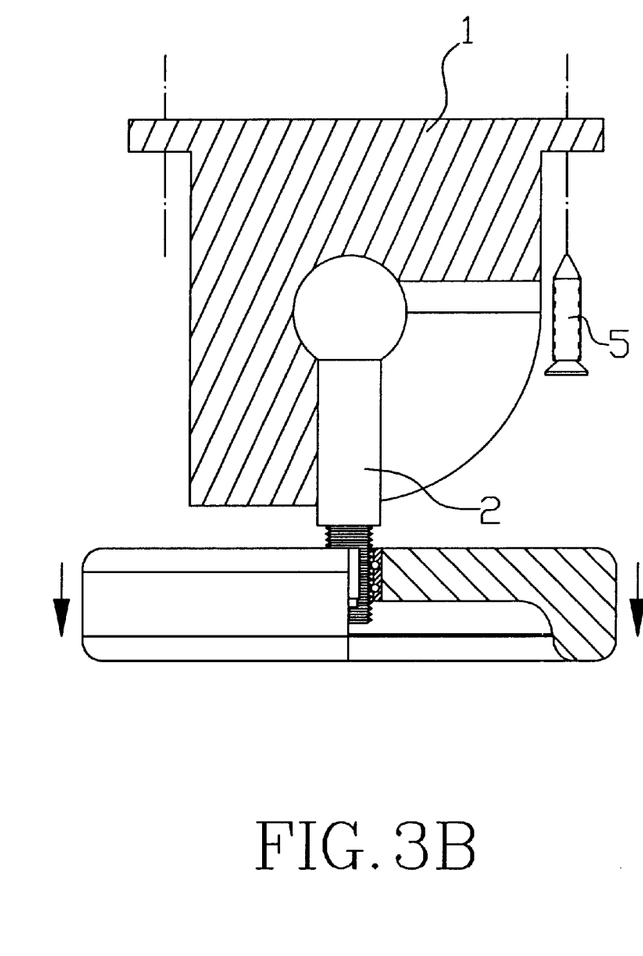

In assembly, the spherical head 21 of the spindle 2 is enclosed in the interior of the integrally injection molded base body 1. The body of the spindle 2 and the screw rod portion 22 extend from the curved grooved track 14 of the base body 1. The width of the curved track 14 is slightly smaller than a larger portion of a stepped shaft of the spindle 2, so that interference fit can be achieved. A little force is required in order to use the spherical head 21 as center to pull the spindle 2 in the curved grooved track 14 (see FIGS. 3A and 3B) to position the spindle 2 vertically or horizontally.

The central caster hole 33 of the caster 3 is then fitted over the bearing 4 so that the outer ring 41 of the bearing 4 is in tight fit with the caster 3 while the inner ring 42 of the bearing 4 can freely rotate on its own. The inner threads of the inner ring 42 of the bearing 4 then engages the screw rod portion 22 of the spindle 2.

Figure 4A:
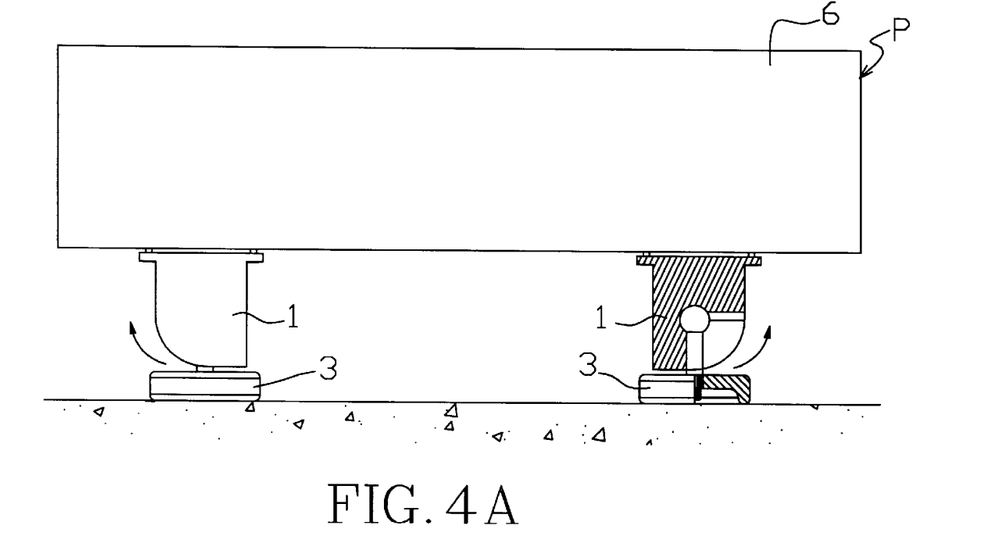
FIGS. 4A and 4B are further embodiments of the present invention.

With reference to FIGS. 1 and 4, the base body 1 is locked by means of screws 5 at four corners of a base of a furniture article 6. When the furniture is to be positioned in place, the spindle 2 inside the base body 1 is erected in an upright position (see FIG. 4A). At this point, the lateral plane of the caster 3 forms a stable face to ensure that the furniture article can stand firmly for a long period of time. Furthermore, since the leg supports of the present invention are mounted in pairs of two at the four corners of the base of a furniture item, when the leg supports are upright and subjected to an external force (P), the limitation of the movement range of the curved grooved track 14 on the other side may generate a counter-force to offset the force (P) so that the leg supports will not drop. If the floor surface is uneven, the inner ring 42 projecting from the bearing 4 can be adjusted to cause the caster 3 and the bearing 4 to displace along the pitches of the screw rod portion 22 to thereby achieve height adjustment (see FIG. 3).

Figure 4B:
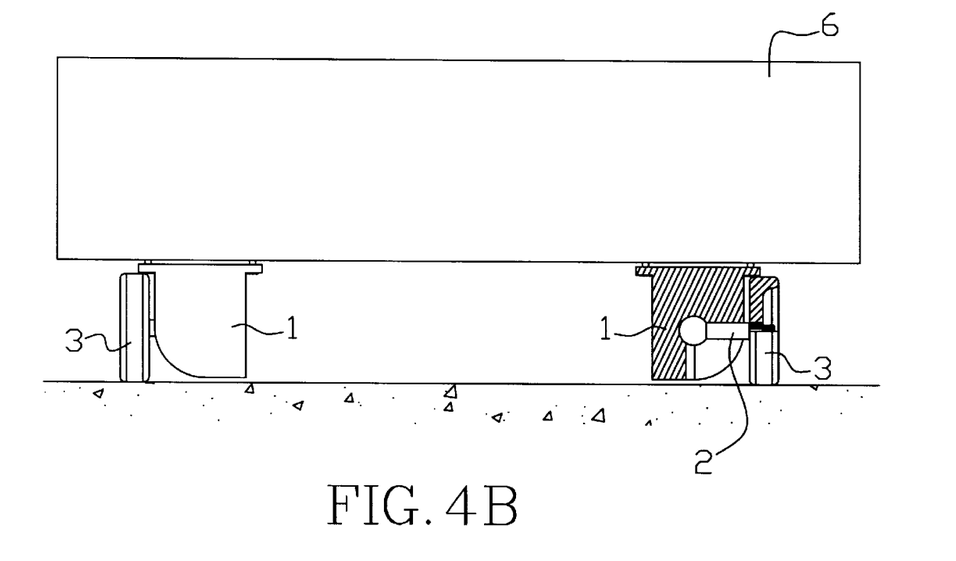

If the furniture item is to be moved, it is only necessary to pull the spindle 2 using the spherical head 21 as the center of the circle along the curved grooved track 14 to the other side so that it come to a level position. At this point, the caster 3 on the spindle 2 is in contact with the floor using its caster face 31 (as shown in FIG. 4B). In this way, the casters 3 of the leg supports serve as wheels to facilitate movement of the furniture item to a suitable place. After moving the furniture item, the spindle 2 is returned to its upright position.

Figure 5A:
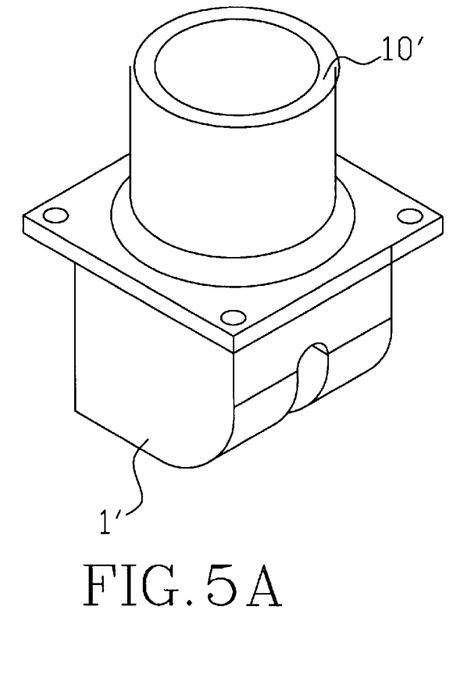
FIGS. 5A, 5B and 5C illustrate other embodiments of a base body of the present invention.
Figure 5B:
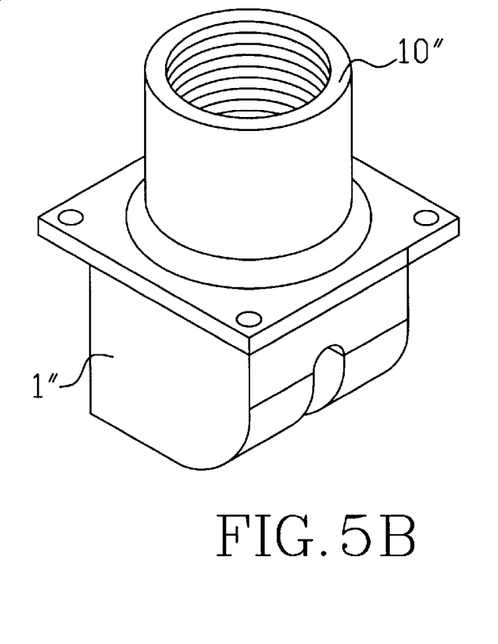
Figure 5C:
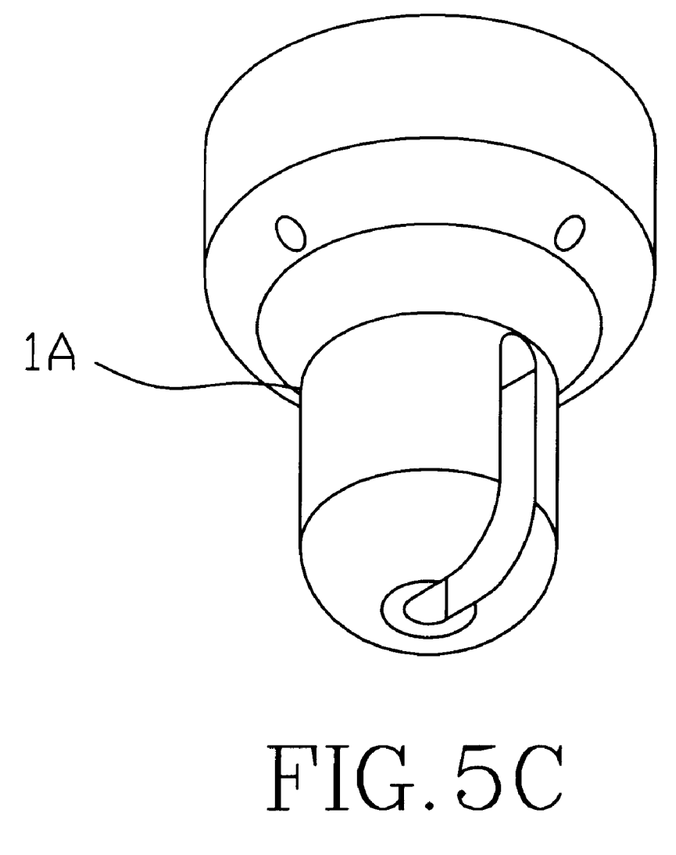

The base body 1 of the present invention can be further provided with a sleeve 10" at the top plate 12 so that it becomes a base body 1' shown in FIG. 5A. The sleeve 10" may be provided with internal threads to form the base body 1" in FIG. 5B. Alternatively, the base body can be configured to be a curved cylindrical post 1A as shown in FIG. 5C.

Figure 6:
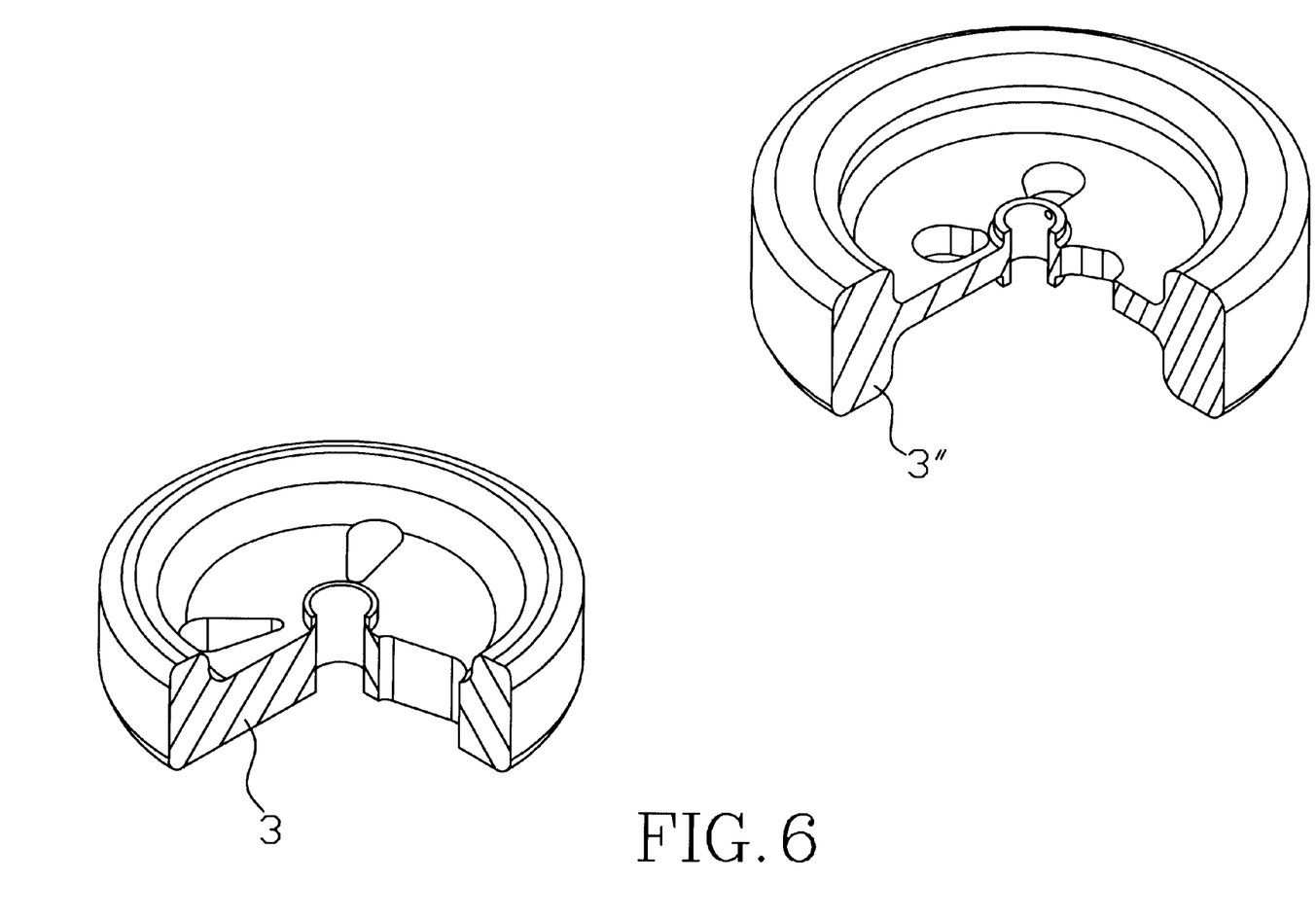
FIG. 6 is another embodiment of a caster of the present invention.

The caster 3 of the present invention can be also be configured to be the caster 3' shown in FIG. 6.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A dual-purpose leg support, comprising a base body adapted to be lockably secured on a base of a furniture item, cabinet or machine, said base body having a spindle insertably provided in a central portion thereof, said spindle having a front end forming a spherical head and an opposite end provided with a screw rod portion, a bearing having a threaded inner ring being screwably locked on said screw rod portion, with a caster fitted thereon, wherein said base body is pre-formed with a curved grooved track that is generally one quarter of an arc so that said spindle can be erected in an upright position with a lateral face of said caster acting as as support or said spindle can be disposed horizontally such that a caster face of said caster is in contact with the floor to allow rolling movement.

2. The dual-purpose leg support as defined in claim 1, wherein said caster face of said caster is generally T-shaped.

3. The dual-purpose leg support as defined in Claim 1, wherein said base body has a top portion provided with a sleeve.

4. The dual-purpose leg support as defined in claim 3, wherein said sleeve at said top portion of said base body is provided with internal threads.

5. The dual-purpose leg support as defined in claim 1, wherein said base body is configured to be a curved cylindrical post.

* * * * *